US011215507B2

(12) United States Patent
Hasegawa et al.

(10) Patent No.: US 11,215,507 B2
(45) Date of Patent: Jan. 4, 2022

(54) SPECTRAL ANALYSIS DEVICE AND SPECTRAL ANALYSIS METHOD (71) Applicant: KYOTO UNIVERSITY, Kyoto (JP)

(72) Inventors: Takeshi Hasegawa, Kyoto (JP); Nobutaka Shioya, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 16/763,424

(22) PCT Filed: Oct. 17, 2018

(86) PCT No.: PCT/JP2018/038601
§ 371 (c)(1),
(2) Date: May 12, 2020

(87) PCT Pub. No.: WO2019/097939
PCT Pub. Date: May 23, 2019

(65) Prior Publication Data
US 2020/0300703 A1 Sep. 24, 2020

(30) Foreign Application Priority Data

Nov. 17, 2017 (JP) .............................. JP2017-222322

(51) Int. Cl.
G01J 3/447 (2006.01)
G01N 21/27 (2006.01)
(Continued)

(52) U.S. Cl.
CPC .............. *G01J 3/447* (2013.01); *G01N 21/27* (2013.01); *G01N 21/66* (2013.01); *G01N 21/8422* (2013.01)

(58) Field of Classification Search
CPC ....................................................... G01J 3/447
(Continued)

(56) References Cited

U.S. PATENT DOCUMENTS 6,519,040 B1* 2/2003 Amos .................... G01J 3/2823
356/453
8,094,308 B2* 1/2012 Hasegawa .......... G01N 21/8422
356/364
(Continued)

FOREIGN PATENT DOCUMENTS

EP 3 339 838 A1 6/2018
JP 2003-090762 A 3/2003
(Continued)

OTHER PUBLICATIONS

International Search Report (ISR) (PCT Form PCT/ISA/210), in PCT/JP2018/038601, dated Jan. 15, 2019.
(Continued)

*Primary Examiner* — Tarifur R Chowdhury
*Assistant Examiner* — Omar H Nixon
(74) *Attorney, Agent, or Firm* — McGinn I.P. Law Group PLLC (57) ABSTRACT A spectral analysis device includes a light source, a support body, a linear polarization filter, a detection unit, a regression computation unit, and an absorbance spectrum calculation unit. The support body is fixed such that an incident angle of the light is a predetermined incident angle θ. The linear polarization filter is configured such that lights with polarization angles $\phi_n$ ranging from 0° to 90° are irradiated to the support body. The detection unit detects a transmitted spectrum S from transmitted lights with the polarization angles $\phi_n$. The regression computation unit obtains an in-plane spectrum $s_{ip}$ and an out-of-plane spectrum $s_{op}$ through regression analysis by using the transmitted spectrum S and a mixing ratio R. The absorbance spectrum calculation unit calculates an in-plane absorbance spectrum $A_{ip}$ and an out-of-plane absorbance spectrum $A_{op}$ of the thin film based on the in-plane spectrum and the out-of-plane spectrum.

7 Claims, 2 Drawing Sheets (51) Int. Cl.
*G01N 21/66* (2006.01)
*G01N 21/84* (2006.01)

(58) Field of Classification Search
USPC .......................................................... 356/453
See application file for complete search history.

(56) References Cited

U.S. PATENT DOCUMENTS

| | | |
|---|---|---|
| 2006/0215158 A1 | 9/2006 | Saitoh |
| 2009/0175450 A1* | 7/2009 | Brandt .................. H04L 9/0858 380/277 |
| 2009/0316152 A1 | 12/2009 | Hasegawa |
| 2012/0307128 A1* | 12/2012 | Vorovitchik ........... G02B 5/201 348/336 |
| 2016/0116397 A1 | 4/2016 | Freudenthal et al. |
| 2017/0003170 A1* | 1/2017 | Kleczewski ......... G02B 27/286 |

FOREIGN PATENT DOCUMENTS

| | | |
|---|---|---|
| JP | 2006-214778 A | 8/2006 |
| JP | 2006-214778 A | 9/2006 |
| JP | 2017-040654 A | 2/2017 |
| WO | WO 2008/099442 A1 | 8/2008 |
| WO | WO 2012/056697 A1 | 5/2012 |
| WO | WO 2014/189967 A2 | 11/2014 |

OTHER PUBLICATIONS

長谷川健, 平滑平面上の吸着 分子の赤外・ ラマン分光法によるキャラクタリゼーション, 分析化学, 2014, vol. 63, No. 6, pp. 485-495, (Hasegawa, Takeshi, Characterization of molecular adsorbates on a flat Surface using infrared and raman spectroscopy, Bunseki Kagaku).

* cited by examiner

SPECTRAL ANALYSIS DEVICE AND SPECTRAL ANALYSIS METHOD

TECHNICAL FIELD

The present invention relates to a spectral analysis device and a spectral analysis method, and more particularly to a spectral analysis device and a spectral analysis method for analyzing molecular orientation in a thin film on a support body.

BACKGROUND ART

Thin films made of, e.g., polyimide, porphyrin, sexiphenyl, sexithienyl, polytetrafluoroethylene, etc. are known as functional organic materials. These thin films are known to improve functions of films or develop new functions when molecules are oriented and aligned in a particular direction. Various techniques for controlling molecular orientation have thus been developed. A technique for analyzing molecular orientation in a thin film is important for making such control on molecular orientation. To analyze molecular orientation in a functional organic material that has been subjected to orientation treatment and to accurately grasp an in-plane structure of atoms near a surface of a thin film are important in studies of functional materials and biotechnology.

Fourier transform infrared spectrometry, soft X-ray absorption spectrometry, ultraviolet photoelectron spectrometry, and other methods are known as such an analytical method of molecular orientation. There is known, as a method capable of more accurate analysis, multiple-angle incidence resolution spectrometry (MAIRS) capable of highly accurately analyzing a thin film on a supporting medium having a high refractive index in combination with infrared spectrometry (see Patent Document 1 and Non-Patent Document 1). This method is to obtain, as two independent spectra, transition moments which are respectively parallel and perpendicular to the thin film when the spectrum of the thin film is measured by absorption spectrometry. In the case of infrared spectrometry, the transition moments parallel and perpendicular to the thin film may be said to be oscillations of a functional group parallel and perpendicular to the thin film. In the multiple-angle incidence resolution spectrometry, unpolarized light is incident on the thin film at a plurality of incident angles, and by analyzing transmitted spectrum of the unpolarized light, the unpolarized light is converted into an absorbance spectrum of an ordinary ray (light having an electric field oscillation perpendicular to the traveling direction of the light) and that of a virtual ray (light having an electric field oscillation in the traveling direction of the light), respectively. Only by comparing the two spectra, it can easily be analyzed how much each functional group is oriented.

Further, as a method for solving a problem in that a support body having a low refractive index cannot be used in the MAIRS, a pMAIRS that measures a p-polarized component using a polarizing filter that blocks an s-polarized component of light irradiating a support body is known (Patent Document 2). The pMAIRS is to obtain an in-plane spectrum and an out-of-plane spectrum by a regression computation from a transmitted light intensity spectrum obtained by irradiating a support body with only p-polarized light at a plurality of different incident angles.

CITATION LIST

Patent Document

Patent Document 1: Japanese Patent Application Kokai Publication No. 2003-090762A
Patent Document 2: International Publication No. 2008/099442 Non-Patent Document
Non-Patent Document 1: Takeshi Hasegawa, "A Novel Optical Technique for Analysis of Surface and Interface Developed by Using Chemometrics", Journal of the Society for Biotechnology, April 2006, Vol. 84, No. 4, Pages 134 to 137

DISCLOSURE OF THE INVENTION

Problems to be Solved by the Invention

However, in the conventional MAIRS or pMAIRS, it is necessary to measure by changing the incident angle of light emitted from a light source with respect to a support body in a wide range from an angle close to normal incidence (low-angle incidence). When at low-angle incidence, an optical fringe (interference fringe) may occur in a spectrum depending on the thickness of a support body or a thin film. The optical fringe becomes a large noise to make it difficult to perform thin film analysis. Further, at the time of measurement when light is incident at low angles, influence of reflecting light reflected back to the light source side cannot be negligible. Double modulation due to such reflecting light increases displacement of water vapor peak derived from water vapor in a measurement environment, for example, thus failing to sufficiently cancel the water vapor peak by subtraction. Further, since there is a necessity of changing the incident angle at measurement, the irradiation area of incident light disadvantageously changes with a change in the incident angle. This also leads to destabilizing factors particularly when a thin film to be analyzed is non-uniform. Further, there occurs no problem when a double-side polished substrate whose both surfaces are uniform is used as a support body; however, when a single-side polished substrate is used, the position of the non-uniform surface changes with a change in the incident angle, thus also leading to destabilizing factors.

Thus, it has been desired to develop a spectral analysis device capable of solving the problems caused due to measurement at low-angle incidence and a change in the incident angle.

In view of the above situation, the present invention has been made and the object thereof is to provide a spectral analysis device and a spectral analysis method capable of obtaining two independent absorbance spectra which are respectively parallel and perpendicular to a thin film even when the incident angle of light emitted from a light source to irradiate a support body is fixed.

Means for Solving the Problems

In order to achieve the above object of the present invention, a spectral analysis device may comprise: a light source capable of emitting light having a predetermined wavelength; a support body that is optically transparent to the light emitted from the light source and supports a thin film to be analyzed, the support body being fixed such that an incident angle of the light emitted from the light source to the support body is a predetermined incident angle θ specific to the support body; a linear polarization filter disposed between the light source and the support body, the linear polarization filter being able to change a polarization angle such that lights with n (n=3, 4, . . . ) different polarization angles $\phi_n$ of arbitrary intervals ranging from 0° to 90° are irradiated to the support body; a detection unit detecting a transmitted spectrum S by receiving each of transmitted lights in which the lights with the n-different polarization angles $\phi_n$ by the linear polarization filter are transmitted through the support body; a regression computation unit obtaining from each of the lights with the n-different polarization angles $\phi_n$ by the linear polarization filter an in-plane spectrum $s_{ip}$ and an out-of-plane spectrum $s_{op}$ through regression analysis by using the transmitted spectrum S detected by the detection unit and a mixing ratio R of the in-plane spectrum $s_{ip}$ and the out-of-plane spectrum $s_{op}$ for each polarization angle; and an absorbance spectrum calculation unit calculating an in-plane absorbance spectrum $A_{ip}$ and an out-of-plane absorbance spectrum $A_{op}$ of the thin film based on the in-plane spectrum $s_{ip}$ and the out-of-plane spectrum $s_{op}$ each obtained by the regression computation unit for each of a state where the thin film is supported on the support body and a state where the thin film is not supported on the support body.

The predetermined incident angle θ specific to the support body may be determined by comparing the out-of-plane absorbance spectrum $A_{op}$ with a longitudinal optical spectrum, wherein the out-of-plane absorbance spectrum $A_{op}$ is calculated by the absorbance spectrum calculation unit when the incident angle of the light emitted from the light source to the support body on which a known standard thin film is supported is arbitrarily changed in a range of 0° to 90°; and the longitudinal optical spectrum is obtained by applying physical calculation to a spectrum that is obtained from the support body on which the known standard thin film is supported by an attenuated total reflection method.

The detection unit may include an intensity ratio calculation unit that calculates the intensity ratio of a transmitted spectrum detected at 0° and that detected at 90°, and the regression computation unit may include a correction unit that corrects the mixing ratio R using the intensity ratio calculated by the intensity ratio calculation unit.

According to the present invention, there may be provided a program allowing a computer to function as the regression computation unit of the spectral analysis device.

According to the present invention, there may be provided a program allowing a computer to function as the absorbance spectrum calculation unit of the spectral analysis device.

Further, a spectral analysis method according to the present invention may comprise: a step of emitting light of a predetermined wavelength from a light source; a step of fixing a support body that is optically transparent to the light emitted from the light source and supports a thin film to be analyzed such that an incident angle of the light emitted from the light source to the support body is a predetermined incident angle θ specific to the support body; a step of changing a polarization angle of a linear polarization filter disposed between the light source and the support body such that lights with n (n=3, 4, . . . ) different polarization angles $\phi_n$ of arbitrary intervals ranging from 0° to 90° are irradiated to the support body;

a step of detecting a transmitted spectrum S by receiving each of transmitted lights in which the lights with the n-different polarization angles $\phi_n$ obtained in the step of changing the polarization angle are transmitted through the support body; a regression computation step of performing regression analysis for obtaining an in-plane spectrum $s_{ip}$ and an out-of-plane spectrum $s_{op}$ by using the transmitted spectrum S detected in the step of detecting from each of the lights with the n-different polarization angles $\phi_n$ obtained in the step of changing the polarization angle and a mixing ratio R of the in-plane spectrum $s_{ip}$ and the out-of-plane spectrum $s_{op}$ for each polarization angle; and an absorbance spectrum calculation step of calculating an in-plane absorbance spectrum $A_{ip}$ and an out-of-plane absorbance spectrum $A_{op}$ of the thin film based on the in-plane spectrum $s_{ip}$ and the out-of-plane spectrum $s_{op}$ each obtained in the regression computation step for each of a state where the thin film is supported on the support body and a state where the thin film is not supported on the support body.

The step of detecting the transmitted spectrum S may include a step of calculating the intensity ratio of a transmitted spectrum detected at 0° and that detected at 90°, and the regression computation step may include a step of correcting the mixing ratio R using the intensity ratio calculated in the step of calculating the intensity ratio.

Advantageous Effects of the Invention

The spectral analysis device according to the present invention is advantageous in that problems caused at the time of measurement when light is incident at low angles and destabilizing factors due to the incident angle change can be eliminated.

BEST MODE FOR CARRYING OUT THE INVENTION

Figure 1:
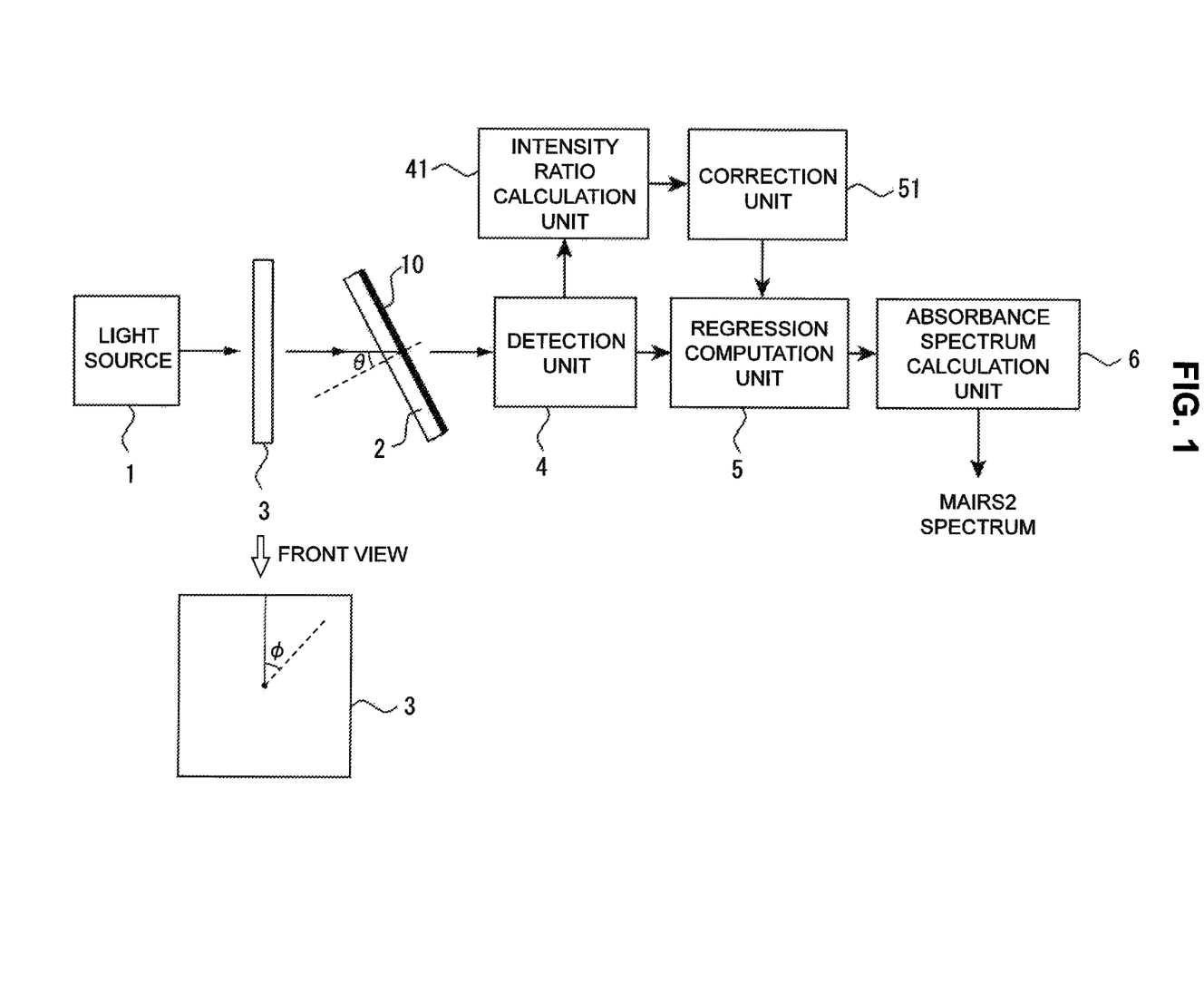
FIG. 1 is a schematic diagram for explaining the entire configuration of a spectral analysis device according to the present invention.

Hereinafter, an embodiment for practicing the present invention will be described with reference to the accompanying drawings. FIG. 1 is a schematic diagram for explaining the entire configuration of a spectral analysis device according to the present invention. As illustrated in FIG. 1, the spectral analysis device according to the present invention is configured to analyze molecular orientation in a thin film 10 and mainly includes a light source 1, a support body 2, a linear polarization filter 3, a detection unit 4, a regression computation unit 5, and an absorbance spectrum calculation unit 6.

The light source 1 is capable of emitting light having a predetermined wavelength. For example, in Fourier transform infrared spectrometry, an infrared light source that generates an infrared ray and an interferometer are used as the light source 1. However, the light source 1 of the spectral analysis device according to the present invention may be of any type that emits light having any wavelength, such as infrared, visible, ultraviolet, and X-rays. The light source 1 can emit light having an arbitrary wavelength as long as the light is optically transparent to the support body 2. Availability of light of any wavelength enables measurement with the use of the support body 2 having any refractive index.

The support body 2 is optically transparent to the light emitted from the light source 1 and supports the thin film 10 to be analyzed. The term "optically transparent" means that light is not absorbed, i.e., an absorption coefficient is zero. The absorption coefficient, however, is not always needed to be completely zero, but may be negligibly small relative to the absorption of light in a thin film. Therefore, even a support body having a high reflectance and a low transmittance can be used as long as it is transparent. Even under a condition that the reflectance is so high as to reduce the intensity of light that reaches the detection unit, the spectral analysis device according to the invention is capable of performing measurement using visible, ultraviolet, and X-rays, so that the intensity of light from the light source accordingly increases, allowing the analysis to be performed with no problem. Examples of the support body include, for example, a germanium substrate or a silicon substrate having a high refractive index, or a calcium fluoride substrate or a glass substrate having a low refractive index as well, and, further, the support body may be of a liquid such as water as long as it is optically transparent. That is, a monomolecular film formed as a thin film on a water surface can be analyzed as a sample. The spectral analysis device according to the present invention is featured in that the support body 2 is fixed such that an incident angle of the light emitted from the light source 1 to irradiate the support body 2 is a predetermined incident angle θ specific to the support body 2. That is, the incident angle θ is the same for support bodies of the same type. Although the incident angle θ will be described later in detail by taking a specific example, it is a constant depending on the refractive index of the support body 2.

The thin film 10 supported by the support body 2 is a sample to be subjected to spectral analysis. Specific examples of the thin film 10 are, for example, functional organic materials such as polyimide, porphyrin, sexiphenyl, sexithienyl, and polytetrafluoroethylene. The thin film 10 is not always needed to have a thickness large enough for it to be called "film". According to the spectral analysis device of the present invention, molecular orientation can be detected even from a layer having a thickness equivalent to one chemical bond. In the example of FIG. 1, the backside incidence condition, in which the thin film 10 is provided on the back surface of the support body 2 as viewed from the light source 1, is illustrated; however, the present invention is not limited to this, but the thin film may be provided on the light incident surface of the support body, or may be provided on both surfaces of the support body.

The linear polarization filter 3 is disposed between the light source 1 and the support body 2. The linear polarization filter 3 allows light emitted from the light source 1 to pass therethrough to make the light into linearly polarized light vibrating only in a specific direction. The spectral analysis device according to the present invention is featured in that this linear polarization filter 3 is used and that the polarization angle thereof is made changeable. That is, the linear polarization filter 3 may be a filter that allows the polarization angle to be changed in the range of 0° to 180°. Specifically, the linear polarization filter 3 is configured to be able to change the polarization angle such that lights with n (n=3, 4, . . . ) different polarization angles $\phi_n$ of arbitrary intervals ranging from, e.g., 0° to 90° are irradiated to the support body 2. The linear polarization filter 3 may be of any type such as a wire grid type, a crystal type, or a polarizing beam splitter type. By rotating such a typical linear polarization filter 3 with respect to the optical axis, the polarization angle can be changed. The polarization angle of the linear polarization filter 3 can be changed in a wide range of, e.g., 0° to 90°. It is assumed here that 0° is a polarization angle of a longitudinal electric field wave and that 90° is a polarization angle of a transverse electric field. In the spectral analysis device according to the present invention, three or more lights with different polarization angles need to irradiate the support body 2. This is because, as described later, the spectral analysis device according to the present invention performs regression analysis using a measured transmitted spectrum, so that an accurate analysis cannot be performed unless there are at least three different transmitted spectrum data. Therefore, the linear polarization filter 3 is configured to be able to irradiate the lights with n (n=3, 4, . . . ) different polarization angles $\phi_n$ of arbitrary intervals to the support body 2.

More specifically, the polarization angles $\phi_n$ may be, for example, seven different polarization angles (0°, 15°, 30°, 45°, 60°, 75°, and 90°) of 15° intervals. The polarization angle may be appropriately adjusted depending on a thin film to be analyzed or a support body supporting the thin film while checking the calculated spectrum.

When focusing on the light incident surface of the support body 2 which is fixed such that light incident angle is a predetermined incident angle θ, i.e., focusing on the film surface of the thin film 10, s-polarized light and p-polarized light are emitted by changing the polarization angle of the linear polarization filter 3. That is, when the incident angle is 0°, the emitted light is s-polarized light, and when the incident angle is 90°, the emitted light is p-polarized light. In the angle range from 0° to 90°, the s-polarized light and the p-polarized light are mixed. That is, the cosine component of the electric field of the incident light contributes to s-polarized light, and the sine component thereof contributes to p-polarized light.

The detection unit 4 detects transmitted spectrum S by receiving each of transmitted lights in which the lights with the n-different polarization angles $\phi_n$ by the linear polarization filter 3 are transmitted through the support body 2. Specifically, the detection unit 4 may be, e.g., a spectrometer that can measure an electromagnetic spectrum of light. The detection unit 4 may be any detector as long as it can detect a transmitted spectrum.

Figure 2A:
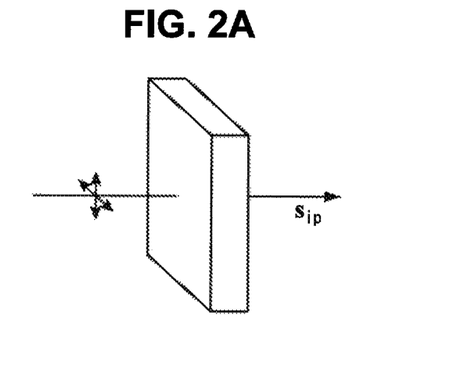
FIGS. 2A and 2B are conceptual views for explaining meanings of an in-plane mode spectrum $s_{ip}$ and an out-of-plane mode spectrum $s_{op}$.
Figure 2B:
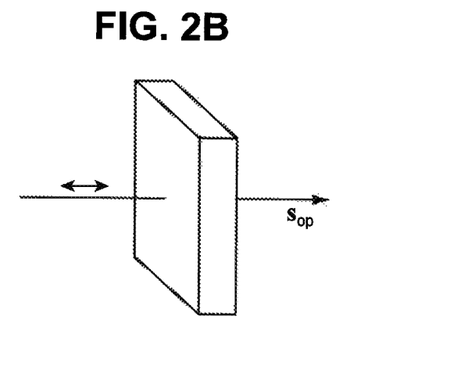

The regression computation unit 5 obtains from each of the lights with the n-different polarization angles $\phi_n$ by the linear polarization filter 3 an in-plane spectrum $s_{ip}$ and an out-of-plane spectrum $s_{op}$ through regression analysis by using the transmitted spectrum S detected by the detection unit 4 and a mixing ratio R of the in-plane spectrum $s_{ip}$ and the out-of-plane spectrum $s_{op}$ for each polarization angle. Meanings of the in-plane spectrum $s_{ip}$ and the out-of-plane spectrum $s_{op}$ will now be described using FIGS. 2A and 2B. The in-plane spectrum $s_{op}$ is a spectrum obtained when an ordinary light is subjected to normal-incidence transmission measurement, as illustrated in FIG. 2A. That is, an electric field vector of light always oscillates perpendicular to the traveling direction of the light. On the other hand, the out-of-plane spectrum $s_{op}$ is a spectrum obtained when a virtual light is subjected to normal-incidence transmission measurement, as illustrated in FIG. 2B. That is, an electric field vector of light oscillates parallel to the traveling direction of the light. The out-of-plane spectrum $s_{op}$ is a spectrum measured from the virtual light which cannot be directly measured. However, the in-plane spectrum $s_{ip}$ and the out-of-plane spectrum $s_{op}$ can be obtained by using the transmitted spectrum S and the mixing ratio R of the in-plane spectrum $s_{ip}$ and the out-of-plane spectrum $s_{op}$ for each polarization angle by utilizing measurement theory based on chemometrics as described below.

A transmitted spectrum $s_{obs}$ that is detected by the detection unit at a given polarization angle can be represented by the following formula by using the in-plane spectrum $s_{ip}$ and the out-of-plane spectrum $s_{op}$ at the time of measurement and respective mixing ratios $r_{ip}$ and $r_{op}$, of the spectra.

$$s_{obs} = s_{ip} r_{ip} + s_{op} r_{op} + U \qquad \text{[Numeral 1]}$$

where U is a non-linear component which cannot be represented only by the in-plane spectrum $s_{ip}$ and the out-of-plane spectrum $s_{op}$.

Based on the above formula, the transmitted spectrum S can be represented by the following formula, as a matrix that collects spectra measured at a plurality of different polarization angles.

$$S \cong \begin{pmatrix} s_{obs1} \\ s_{obs2} \\ \vdots \\ s_{obsn} \end{pmatrix} = \begin{pmatrix} r_{ip1} & r_{op1} \\ r_{ip2} & r_{op2} \\ \vdots & \vdots \\ r_{ipn} & r_{opn} \end{pmatrix} \begin{pmatrix} s_{ip} \\ s_{op} \end{pmatrix} + U \cong R \begin{pmatrix} s_{ip} \\ s_{op} \end{pmatrix} + U \qquad \text{[Numeral 2]}$$

where R is a matrix that collects the mixing ratios $r_{ip}$ and $r_{op}$, of the in-plane spectrum $s_{ip}$ and the out-of-plane spectrum $s_{op}$ for each polarization angle.

The above formula can be transformed by regression analysis into the following regression formula without using the non-linear component U.

$$\begin{pmatrix} s_{ip} \\ s_{op} \end{pmatrix} = (R^T R)^{-1} R^T S \qquad \text{[Numeral 3]}$$

where the superscript T denotes a transposed matrix, and the superscript −1 denotes an inverse matrix.

From this formula, only a linear component can be extracted by disregarding the non-linear component U. Accordingly, the in-plane spectrum $s_{ip}$ and the out-of-plane spectrum $s_{op}$ can be obtained when the measured transmitted spectrum S and mixing ratio R are available.

The mixing ratio R will hereinafter be described. As described in Non-Patent Document 1, according to the conventional MAIRS, it is known that the matrix of a mixing ratio $R_{MAIRS}$ can be represented as follows by using electric field vector components of light obliquely incident onto the surface of the support body 2 at a plurality of incident angles $\theta_n$.

$$R_{MAIRS} = C \begin{pmatrix} 1 + \cos^2\theta_1 + \sin^2\theta_1 \tan^2\theta_1 & \tan^2\theta_1 \\ 1 + \cos^2\theta_2 + \sin^2\theta_2 \tan^2\theta_2 & \tan^2\theta_2 \\ \vdots & \vdots \\ 1 + \cos^2\theta_j + \sin^2\theta_j \tan^2\theta_j & \tan^2\theta_j \\ \vdots & \vdots \\ 1 + \cos^2\theta_n + \sin^2\theta_n \tan^2\theta_n & \tan^2\theta_n \end{pmatrix} \qquad \text{[Numeral 4]}$$

where C is a constant, and $\theta_j$ is the j-th (j=1, 2, . . . n) incident angle of n indent angles of the light from the light source.

In the spectral analysis device according to the present invention, the incident angle θ is a constant specific to the support body 2, and the support body 2 is fixed such that light incident angle is a predetermined incident angle θ.

Further, the spectral analysis device according to the present invention is configured such that, by using the linear polarization filter 3, the polarization angles can be changed for irradiating to the support body 2 the lights with n (n=3, 4, . . . ) different polarization angles $\phi_n$ of arbitrary intervals within a wide range from, e.g., 0° to 90°. Thus, the cosine component of the electric field vector components of the incident light contributes to s-polarized light, and the sine component thereof contributes to p-polarized light. That is, the cosine component contributes to the in-plane spectrum $s_{ip}$, and sine component contributes to the in-plane spectrum $s_{ip}$ and the out-of-plane spectrum $s_{op}$.

To summarize the above, the components of the in-plane spectrum $s_{ip}$ and the out-of-plane spectrum $s_{op}$ have the relationship as shown in the following table.

TABLE 1

|  | $E_s$ | $E_p$ | |
|---|---|---|---|
| $s_{ip}$ | cos φ | sin φ sin θ tan θ | sin φ cos θ |
| $s_{op}$ | — | sin φ tan θ | — |

Therefore, in the spectral analysis device according to the present invention, the matrix of the mixing ratio R can be represented by the following formula through transformation from the formula of numeral 4, taking into consideration that the intensity of each electric field vector is detected as a square thereof.

$$R = C \begin{pmatrix} \cos^2\phi_1 + (\cos^2\theta + \sin^2\theta\tan^2\theta)\sin^2\phi_1 & \tan^2\theta\sin^2\phi_1 \\ \cos^2\phi_2 + (\cos^2\theta + \sin^2\theta\tan^2\theta)\sin^2\phi_2 & \tan^2\theta\sin^2\phi_2 \\ \vdots & \vdots \\ \cos^2\phi_j + (\cos^2\theta + \sin^2\theta\tan^2\theta)\sin^2\phi_j & \tan^2\theta\sin^2\phi_j \\ \vdots & \vdots \\ \cos^2\phi_n + (\cos^2\theta + \sin^2\theta\tan^2\theta)\sin^2\phi_n & \tan^2\theta\sin^2\phi_n \end{pmatrix} \qquad \text{[Numeral 5]}$$

Where $\phi_j$ is the j-th (j=1, 2, . . . n) polarization angle of n polarization angles of light from the light source.

The regression computation unit 5 of the spectral analysis device according to the present invention is capable of obtaining the in-plane spectrum $s_{ip}$ and the out-of-plane spectrum $s_{op}$, through the regression analysis shown in the above numeral 3, by using the transmitted spectrum S detected by the detection unit 4 for each of the lights with the n-different polarization angles $\phi_n$ by the linear polarization filter 3 and the mixing ratio R of the in-plane spectrum $s_{ip}$ and the out-of-plane spectrum $s_{op}$ for each polarization angle shown in numeral 5.

In performing thin film analysis, light that has transmitted through the surface of a thin film is incident onto the thin film and the support body to cause unexpected complicated phenomena such as absorptions and multiple reflections. To eliminate the influence of such phenomena, the absorbance spectrum calculation unit 6 in the spectral analysis device according to the present invention calculates an in-plane absorbance spectrum $A_{ip}$ and an out-of-plane absorbance spectrum $A_{op}$ of the thin film based on the in-plane spectrum $s_{ip}$ and the out-of-plane spectrum $s_{op}$ that the regression computation unit 5 calculates for each of a state where the thin film is supported on a support body and a state where the thin film is not supported on the support body. More specifically, the in-plane absorbance spectrum $A_{ip}$ and the out-of-plane absorbance spectrum $A_{op}$ of the thin film to be finally used may be obtained by which an in-plane spectrum $s^s_{ip}$ and an out-of-plane spectrum $s^s_{op}$ in a state where the thin film is supported on the support body are respectively divided by an in-plane spectrum $s^B_{ip}$ and an out-of-plane spectrum $s^B_{op}$ in a state where the thin film is not supported on the support body, and then taking the logarithm thereof. That is, final in-plane absorbance spectra $A_{ip}$ and $A_{op}$, i.e., MAIRS2 spectra can be obtained by the following formula.

$$A_{ip} = -\log_{10}\left(\frac{s^s_{ip}}{s^B_{ip}}\right)$$ [Numeral 6]

$$A_{op} = -\log_{10}\left(\frac{s^s_{op}}{s^B_{op}}\right)$$

In practice, each division of vectors is carried out as a scalar division at each wave number position.

The transmitted spectrum S may firstly be detected from only the support body, and then the in-plane spectrum $s^B_{ip}$ and the out-of-plane spectrum $s^B_{op}$ may further be calculated. Thereafter, the transmitted spectrum S may be detected with a thin film deposited on the support body, and the in-plane spectrum $s^s_{ip}$ and the out-of-plane spectrum $s^s_{op}$ may further be calculated. When the in-plane spectrum $s^B_{ip}$ and the out-of-plane spectrum $s^B_{op}$ for only the support body are known in advance, the transmitted spectrum S for only the support body need not be detected.

The above regression computation unit 5 and the absorbance spectrum calculation unit 6 may each be a program for making an electronic calculator such as a computer function as the regression computation unit 5 and the absorbance spectrum calculation unit 6 of the spectral analysis device.

In the spectral analysis device according to the present invention, the predetermined incident angle θ specific to a support body is a constant depending on the refractive index of the support body. The incident angle θ may be calculated as follows. First, a conventional Attenuated Total Reflection method (ATR method) is used to calculate a spectrum for a support body on which a known standard thin film is supported. The calculated spectrum is subjected to physical calculation to obtain a longitudinal optical spectrum (LO spectrum) and a traverse optical spectrum (TO spectrum). Specifically, the physical calculation uses the Kramers-Kronig relational expression to perform transformation into a dielectric function. The LO spectrum and the TO spectrum are respectively the out-of-plane spectrum and in-plane spectrum, which seem to be correct, of a support body on which a known standard thin film is supported. At the same time, the spectral analysis device according to the present invention is used to arbitrarily change, in the range of 0° to 90°, the incident angle θ of light to be emitted from the light source 1 to irradiate the support body 2 on which the known standard thin film that is the same as that measured by the ATR method is supported. Then, absorbance spectra are obtained by the absorbance spectrum calculation unit 6 for respective indent angles θ while the polarization angle $\phi_n$ is changed. At this time, the in-plane spectrum is stable and hardly depends on the incident angle. On the other hand, the out-of-plane spectrum significantly depends on the incident angle. Thus, the out-of-plane absorbance spectrum $A_{op}$ is calculated, and then the out-of-plane absorbance spectrum $A_{op}$ and the LO spectrum obtained by the ATR method are compared with each other to thereby determine an incident angle θ when the out-of-plane absorbance spectrum $A_{op}$ is closest to the LO spectrum.

More specifically, for example, 2-perfluorobutylethyl acrylate (C4FA) is used as a standard thin film, and, for example, a silicon (Si) substrate is used as a support body. Then, the spectrum in this case and the spectrum of tetrafluoroethylene ($CF_2$) may be compared. In this case, in the LO spectrum obtained by the ATR method, the peak of $CF_2$ appears at 1138.2. On the other hand, in the case of the spectral analysis device according to the present invention, when the absorbance spectrum calculation unit 6 is used to calculate the absorbance spectrum while arbitrarily changing, in the range of 0° to 90°, the incident angle of light emitted from the light source 1 to irradiate the support body 2, the peak of the $CF_2$ of the out-of-plane absorbance spectrum $A_{op}$ linearly changes. As a result of comparison, in the case of the silicon substrate, the closest spectrum is obtained when the incident angle is, e.g., near 43° to 47°, more particularly, near 45°. That is, when the support body is the silicon substrate, the incident angle θ may be set to, e.g., 45°. When the support body is a cesium iodide (CsI) substrate, the incident angle θ is 39°. Examples of the optimum incident angles for typical materials that can be used as the support body are listed in the following Table 2.

TABLE 2

| Substrate material | Optimum incident angle θ (°) |
| --- | --- |
| Germanium (Ge) | 45 |
| Silicon (Si) | 45 |
| Diamond (C) | 44 |
| Zinc selenide (ZnSe) | 44 |
| KRS-5 (TlBr$_{0.42}$I$_{0.58}$) | 44 |
| Zinc sulfide (ZnS) | 43 |
| Silver chloride (I) (AgCl) | 41 |
| Cesium iodide (CsI) | 39 |
| Potassium bromide (KBr) | 35 |
| Sodium chloride (NaCl) | 35 |
| Silicon dioxide (SiO$_2$) | 34 |
| Barium fluoride (BaF$_2$) | 34 |
| Potassium chloride (KCl) | 34 |
| Calcium fluoride (CaF$_2$) | 33 |
| Lithium fluoride (FiF) | 32 |

When Fourier transform infrared spectroscopy is used in the spectral analysis device according to the present invention, an optical system has different sensitivity characteristics (polarization characteristics) for s-polarized light and p-polarized light. Therefore, the ratio of the in-plane spectrum $s_{ip}$ and the out-of-plane spectrum $s_{op}$ to be obtained may be changed. To cope with this, the mixing ratio R may be corrected. For example, an intensity ratio calculation unit 41 is provided in the detection unit 4. The intensity ratio calculation unit 41 is configured to calculate the intensity ratio of the transmitted spectrum detected at 0° and that detected at 90°. Further, a correction unit 51 is provided in the regression computation unit 5. The correction unit 51 is configured to correct the mixing ratio R using the intensity ratio calculated by the intensity ratio calculation unit 41. More specifically, γ can be represented by the following formula, assuming that the intensity ratio of a transmitted spectrum $s^{\phi=0°}$ obtained at a polarization angle of 0° and a transmitted spectrum $s^{\phi=90°}$ obtained at a polarization angle of 90° is defined as a polarization-dependent spectrum γ.

$$\gamma = \frac{s^{\phi=0°}}{s^{\phi=90°}}$$ [Numeral 7]

Using the polarization-dependent spectrum γ that is the intensity ratio calculated by the intensity ratio calculation unit 41, the correction unit 51 may correct the mixing ratio R as follows.

$$R = C \begin{pmatrix} \gamma\cos^2\phi_1 + (\cos^2\theta + \sin^2\theta\tan^2\theta)\sin^2\phi_1 & \tan^2\theta\sin^2\phi_1 \\ \gamma\cos^2\phi_2 + (\cos^2\theta + \sin^2\theta\tan^2\theta)\sin^2\phi_2 & \tan^2\theta\sin^2\phi_2 \\ \vdots & \vdots \\ \gamma\cos^2\phi_j + (\cos^2\theta + \sin^2\theta\tan^2\theta)\sin^2\phi_j & \tan^2\theta\sin^2\phi_j \\ \vdots & \vdots \\ \gamma\cos^2\phi_n + (\cos^2\theta + \sin^2\theta\tan^2\theta)\sin^2\phi_n & \tan^2\theta\sin^2\phi_n \end{pmatrix}$$
[Numeral 8]

Although the polarization-dependent spectrum γ is a vector quantity in nature, it is difficult to incorporate the polarization-dependent spectrum γ into the mixing ratio R that does not depend on the wave number. Thus, a constant, for example, γ=0.65, that can be applied in a common spectrometer of the detection unit 4 may be used.

Figure 3:
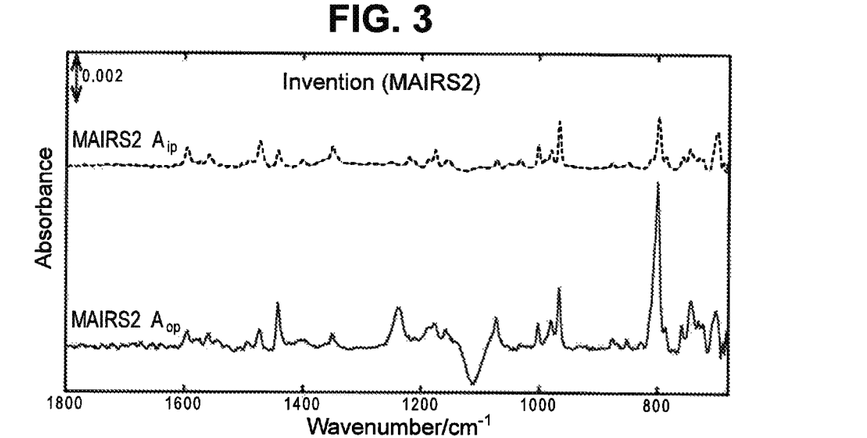
FIG. 3 is a graph illustrating MAIRS2 spectrum obtained by measuring a predetermined sample using the spectral analysis device according to the present invention.
Figure 4:
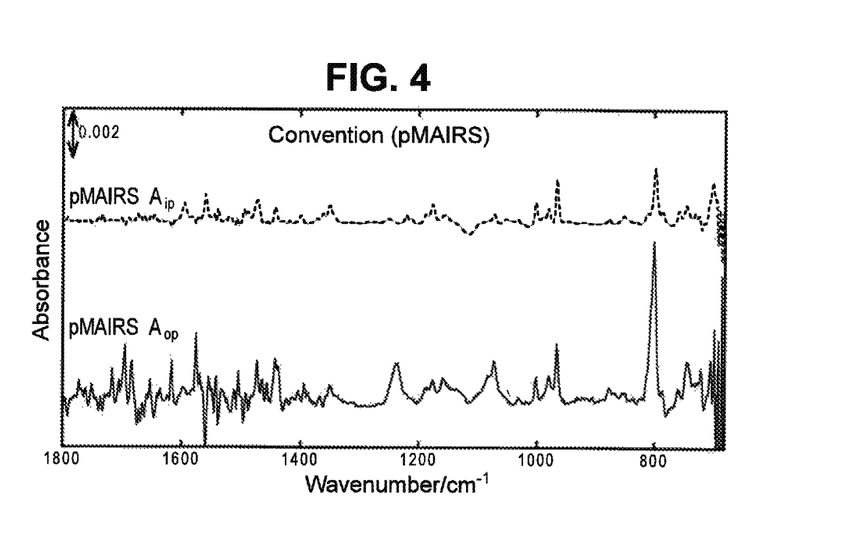
FIG. 4 is a graph illustrating pMAIRS spectrum obtained by measuring, using a conventional pMAIRS method, the same thin film as used in the measurement of FIG. 3.

The following describes specific examples of results obtained by measuring a predetermined sample using the above configured spectral analysis device according to the present invention. In this measurement, a silicon substrate was used as the support body 2, and zinc (II) tetra-phenyl porphyrin complex (ZnTPP) thin film was used as the thin film 10 supported on the silicon substrate. Further, as measurement conditions, a light source emitting an infrared light was used as the light source 1, and the support body 2 was fixed such that the incident angle θ of light from the light source 1 was 45°. Then, the polarization angle $\phi_n$ of the linear polarization filter 3 was changed in 15° intervals such that the lights with seven different polarization angles (0°, 15°, 30°, 45°, 60°, 75°, and 90°) are irradiated to the support body 2. Under such measurement conditions, the transmitted spectrum was measured at each polarization angle $\phi_n$, whereby seven in-plane spectra $s_{ip}$ and seven out-of-plane spectra $s_{op}$ were obtained by the regression computation unit 5. From the each obtained in-plane spectrum $s_{ip}$ and the out-of-plane spectrum $s_{op}$, the absorbance spectrum calculation unit 6 calculated the in-plane absorbance spectrum $A_{ip}$ and the out-of-plane absorbance spectrum $A_{op}$ of the thin film. FIG. 3 illustrates the spectrum (MAIRS2 spectrum) obtained as a result of the analysis. FIG. 4 illustrates, as a comparison example, pMAIRS spectrum obtained by analyzing the same sample by a conventional pMAIRS method.

In the result of FIG. 4 obtained by using the conventional pMAIRS method, many noise peaks derived from water vapor appear in the out-of-plane absorbance spectrum $A_{op}$, while in the result of FIG. 3 obtained by using the spectral analysis device according to the present invention, the number of such noise peaks significantly decreases to allow only peaks derived from compounds to be accurately identified. The absorbance to such a noise peak derived from water vapor is about 0.003, which is comparable to the absorbance of a band that a thin film of a monomolecular film level gives. That is, although it has been difficult to analyze a very thin film of a monomolecular film level by the conventional pMAIRS method, it can be analyzed with very high accuracy by the spectral analysis device according to the present invention. Further, as can be seen from FIGS. 3 and 4, in the spectral analysis device according to the present invention, when the correction is performed ideally using the above-described polarization-dependent spectrum γ, the intensity of the peak of the absorbance is the same as that obtained by the conventional pMAIRS method.

The noise peak derived from water vapor due to influence of low-angle incidence and the optical fringe are problems not only for the pMAIRS method but also for conventional infrared spectrometry methods such as a transmission method and an ATR method. The spectral analysis device according to the present invention can eliminate such problems by realizing the structure in which low-angle incidence is not performed. Further, by fixing the incident angle, it is possible to eliminate the problem of a change in the irradiation area of the incident light. Therefore, even a non-uniform thin film can be analyzed. Further, even a support body like a single-side polished substrate can be used.

Using the spectral analysis device according to the present invention theoretically allows even, for example, the orientation angle of a thin film to be calculated in the similar manner to the conventional MAIRS method or pMAIRS method. That is, for example, the orientation angle of a thin film can be represented as follows.

$$\tan^{-1}\left(\sqrt{\frac{2A_{ip}}{A_{op}}}\right)$$
[Numeral 9]

Further, it is possible to correct the orientation angle according to the following formula by taking the refractive index n of a thin film into consideration.

$$\tan^{-1}\left(\sqrt{\frac{2A_{ip}}{n^4 HA_{op}}}\right)$$
[Numeral 10]

Where H is a parameter specific to a support body.

The spectral analysis device according to the present invention is not limited to the above illustrative examples but may be variously modified without departing from the scope of the present invention. s

REFERENCE SIGNS LIST

1: Light source
2: Support body
3: Linear polarization filter
4: Detection unit
5: Regression computation unit
6: Absorbance spectrum calculation unit
10: Thin film
41: Intensity ratio calculation unit
51: Correction unit

The invention claimed is:

1. A spectral analysis device for analyzing the molecular orientation of a thin film, said spectral analysis device comprising:
   a light source capable of emitting light having a predetermined wavelength;
   a support body that is optically transparent to the light emitted from the light source and supports a thin film to be analyzed, the support body being fixed such that an incident angle of the light emitted from the light source to the support body is a predetermined incident angle θ specific to the support body;
   a linear polarization filter disposed between the light source and the support body, the linear polarization filter being able to change a polarization angle such that lights with n (n=3, 4, . . . ) different polarization angles $\phi_n$ of arbitrary intervals ranging from 0° to 90° are irradiated to the support body;

a detection unit detecting a transmitted spectrum matrix S collecting each transmitted spectrum $s_{obs}$ detected for each polarization angle $\phi_n$ by receiving each of transmitted lights in which the lights with the n-different polarization angles $\phi_n$ by the linear polarization filter are transmitted through the support body;

a regression computation unit obtaining an in-plane spectrum $s_{ip}$, which is a spectrum obtained when ordinary light having an electric field oscillation perpendicular to a traveling direction of the light is subjected to normal-incidence transmission measurements, and an out-of-plane spectrum $s_{op}$, which is a spectrum obtained when virtual light having an electric field oscillation in a atraveling direction of the light is subjected to normal-incidence transmission measurements, through regression analysis by using the transmitted spectrum matrix S detected by the detection unit and a mixing ratio R of the in-plane spectrum $s_{ip}$ and the out-of-plane spectrum $s_{op}$ for each polarization angle; and an absorbance spectrum calculation unit calculating an in-plane absorbance spectrum $A_{ip}$ and an out-of-plane absorbance spectrum $A_{op}$ of the thin film based on the in-plane spectrum $s_{ip}$ and the out-of-plane spectrum $s_{op}$ each obtained by the regression computation unit for each of a state where the thin film is supported on the support body and a state where the thin film is not supported on the support body.

2. The spectral analysis device according to claim 1, in which the predetermined incident angle θ specific to the support body is determined by comparing the out-of-plane absorbance spectrum $A_{op}$ with a longitudinal optical spectrum, wherein the out-of-plane absorbance spectrum $A_{op}$ is calculated by the absorbance spectrum calculation unit when the incident angle of the light emitted from the light source to the support body on which a known standard thin film is supported is arbitrarily changed in a range of 0° to 90°; and the longitudinal optical spectrum is obtained by applying physical calculation to a spectrum that is obtained from the support body on which the known standard thin film is supported by an attenuated total reflection method.

3. The spectral analysis device according to claim 1, in which the detection unit includes an intensity ratio calculation unit that calculates the intensity ratio of a transmitted spectrum detected at 0° and that detected at 90°, and the regression computation unit includes a correction unit that corrects the mixing ratio R using the intensity ratio calculated by the intensity ratio calculation unit.

4. A non-transitory computer-readable medium bearing a computer program allowing a computer to function as the regression computation unit of the spectral analysis device as claimed in claim 1.

5. A non-transitory computer-readable medium bearing a computer program allowing a computer to function as the absorbance spectrum calculation unit of the spectral analysis device as claimed in claim 1.

6. A spectral analysis method for use in analysis of a thin film, the spectral analysis method comprising:

a step of emitting light of a predetermined wavelength from a light source;

a step of fixing a support body that is optically transparent to the light emitted from the light source and supports a thin film to be analyzed such that an incident angle of the light emitted from the light source to the support body is a predetermined incident angle θ specific to the support body;

a step of changing a polarization angle of a linear polarization filter disposed between the light source and the support body such that lights with n (n=3, 4, . . . ) different polarization angles $\phi_n$ of arbitrary intervals ranging from 0° to 90° are irradiated to the support body;

a step of detecting a transmitted spectrum matrix S collecting each transmitted spectrum $s_{obs}$ detected for each polarization angle $\phi_n$ by receiving each of transmitted lights in which the lights with the n-different polarization angles $\phi_n$ obtained in the step of changing the polarization angle are transmitted through the support body;

a regression computation step of performing regression analysis for obtaining an in-plane spectrum $s_{ip}$, which is a spectrum obtained when ordinary light having an electric field oscillation perpendicular to a traveling direction of the light is subjected to normal-incidence transmission measurements, and an out-of-plane spectrum $s_{op}$, which is a spectrum obtained when virtual light having an electric field oscillation in a atraveling direction of the light is subjected to normal-incidence transmission measurements, by using the transmitted spectrum matrix S detected in the step of detecting and a mixing ratio R of the in-plane spectrum $s_{ip}$ and the out-of-plane spectrum $s_{op}$ for each polarization angle; and an absorbance spectrum calculation step of calculating an in-plane absorbance spectrum $A_{ip}$ and an out-of-plane absorbance spectrum $A_{op}$ of the thin film based on the in-plane spectrum $s_{ip}$ and the out-of-plane spectrum $s_{op}$ each obtained in the regression computation step for each of a state where the thin film is supported on the support body and a state where the thin film is not supported on the support body.

7. The spectral analysis method according to claim 6, in which the step of detecting the transmitted spectrum matrix S includes a step of calculating the intensity ratio of a transmitted spectrum detected at 0° and that detected at 90°, and the regression computation step includes a step of correcting the mixing ratio R using the intensity ratio calculated in the step of calculating the intensity ratio.

* * * * *